United States Patent
Lin

(10) Patent No.: US 8,766,999 B2
(45) Date of Patent: Jul. 1, 2014

(54) SYSTEMS AND METHODS FOR LOCAL TONE MAPPING OF HIGH DYNAMIC RANGE IMAGES

(75) Inventor: Peng Lin, Pleasanton, CA (US)

(73) Assignee: Aptina Imaging Corporation, George Town (KY)

( * ) Notice: Subject to any disclaimer, the term of this patent is extended or adjusted under 35 U.S.C. 154(b) by 535 days.

(21) Appl. No.: 12/784,066

(22) Filed: May 20, 2010

(65) Prior Publication Data

US 2011/0285737 A1 Nov. 24, 2011

(51) Int. Cl.
*G09G 5/02* (2006.01)
*G06K 9/00* (2006.01)

(52) U.S. Cl.
USPC ......................... 345/589; 382/162

(58) Field of Classification Search
CPC ............. G06T 5/00; G09G 2320/0271; G09G 2320/066; G09G 2360/16; G09G 5/10
USPC ......................... 345/589; 382/162
See application file for complete search history.

(56) References Cited

U.S. PATENT DOCUMENTS

| | | | | |
|---|---|---|---|---|
| 5,589,890 A * | 12/1996 | Mancuso et al. | ............... | 348/678 |
| 7,834,915 B2 * | 11/2010 | Wakazono et al. | ......... | 348/229.1 |
| 7,843,493 B2 * | 11/2010 | Katagiri et al. | ............ | 348/222.1 |
| 8,059,214 B2 * | 11/2011 | Oka | ............................. | 348/790 |
| 8,086,032 B2 * | 12/2011 | Kamon et al. | ................. | 382/166 |
| 2008/0284878 A1* | 11/2008 | Kosakai et al. | ............... | 348/241 |
| 2009/0317017 A1* | 12/2009 | Au et al. | ........................ | 382/274 |
| 2011/0149308 A1* | 6/2011 | Hinds et al. | .................... | 358/1.9 |

* cited by examiner

*Primary Examiner* — Kee M Tung
*Assistant Examiner* — Frank Chen
(74) *Attorney, Agent, or Firm* — Kramer Levin Naftalis & Frankel LLP

(57) ABSTRACT

This is generally directed to systems and methods for local tone mapping of high dynamic range ("HDR") images. For example, a HDR image can have its larger dynamic range mapped into the smaller dynamic range of a display device. In some embodiments, to perform the local tone mapping, a RGB to Y converter can be used to convert the input image signal to a luminance signal in the YCgCo color space, a shape adaptive filter can be used to separate the luminance signal into its illumination and reflectance components, contrast compression can be applied to the illumination component, image sharpening can be applied to the reflectance component, and the processed illumination and reflection components can be used to calculate a processed RGB signal. The dynamic range of the processed RGB signal can then be mapped into the dynamic range of the display device.

16 Claims, 5 Drawing Sheets

SYSTEMS AND METHODS FOR LOCAL TONE MAPPING OF HIGH DYNAMIC RANGE IMAGES

FIELD OF THE INVENTION

The present invention relates to systems and methods for local tone mapping of high dynamic range images.

BACKGROUND OF THE INVENTION

In real life, scenes can oftentimes include a very high dynamic range, where the "dynamic range" of a scene can be defined as the luminance ratio between the brightest and the darkest objects in the scene. For example, a scene including a tree on a bright, sunny may have both bright areas where the sunlight is illuminating objects and very dark areas that are within the shade of the tree, thus resulting in a wide dynamic range for that scene. Nowadays, various imaging system have been developed to effectively capture images of such high dynamic range ("HDR") scenes. As an example, one method of HDR imaging can capture several low dynamic range images, where each low dynamic range image is taken under a different exposure time. For example, one low dynamic range image can have a long exposure time to suitably capture the dark areas of the scene, another low dynamic range image can have a short exposure time to suitably capture the bright areas of the scene, and so forth. The several low dynamic range images may then be combined to form a single, HDR image that can clearly portray image features ranging from dark shadows to bright lights.

However, even though imaging systems have been developed to capture HDR images having a wide luminance range, the portrayal of such HDR images can be limited by the display device used to display the HDR image. For example, nowadays a typical liquid crystal display ("LCD") monitor can have a contrast ratio of, for example, 1,000:1, where the "contrast ratio" of a display device can define the ratio of the luminance of the brightest color to the darkest color that the monitor can produce. However, a typical HDR image can have a dynamic range of, for example, 250,000:1. In other words, it may not be uncommon for an HDR image to have a greater dynamic range than a display device attempting to display that HDR image. Accordingly, in order to reproduce the HDR image on the relatively low dynamic range display device, the luminance range of the HDR image can be compressed to within the available luminance range of the display device. This technique for compressing the luminance range of the HDR image to the range of the display device can be referred to as "tone mapping."

DETAILED DESCRIPTION OF THE INVENTION

Figure 1:
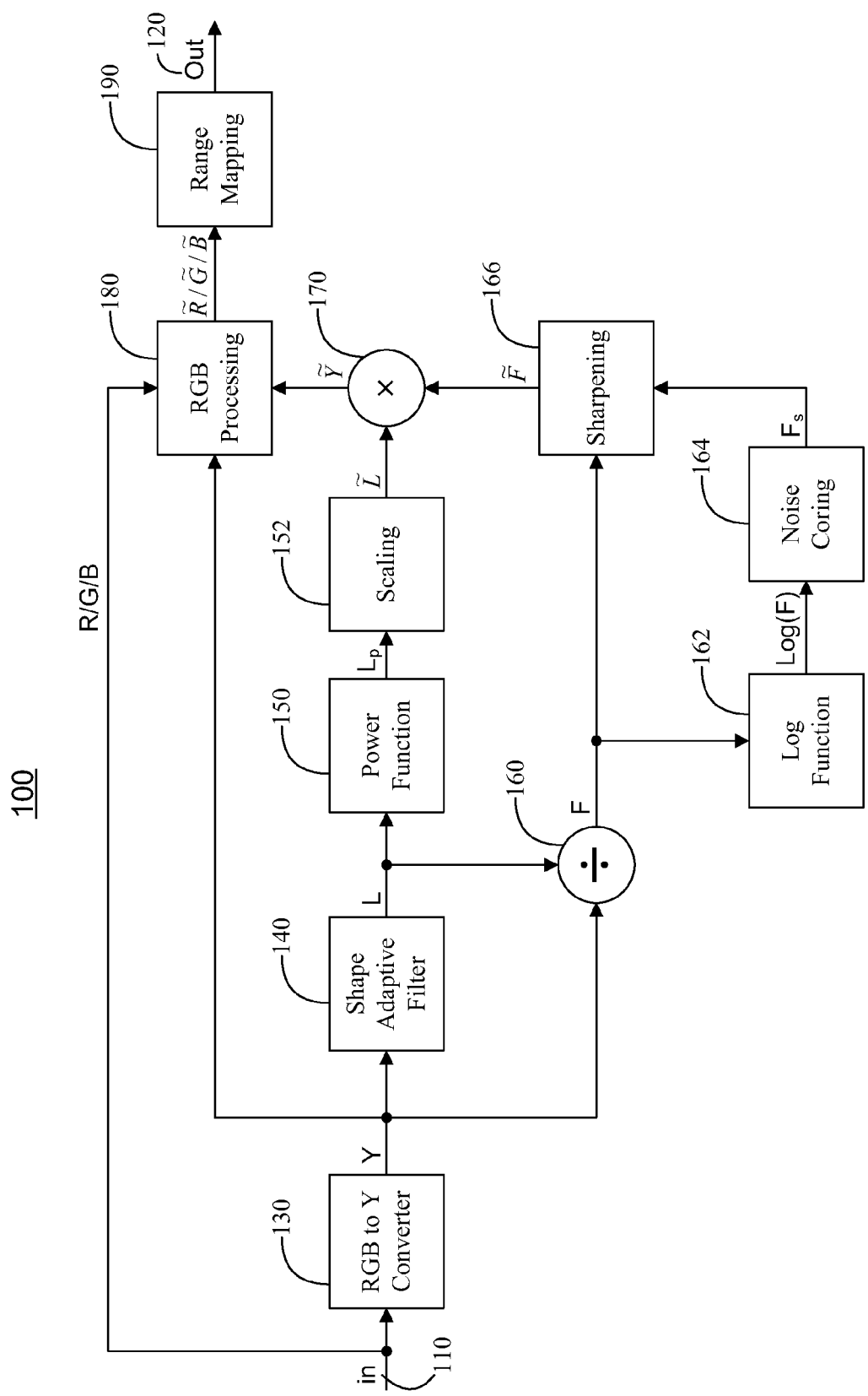
FIG. 1 shows a block diagram of an illustrative system for implementing a local tone mapping algorithm in accordance with some embodiments of the invention.

Discussed herein are systems and methods for local tone mapping of high dynamic range ("HDR") images. An HDR image can include, for example, any digital image with a relatively large available luminance range. For example, such an HDR image may effectively capture image detail in both dark and bright areas of the image. One way of capturing such an HDR image can be to combine a series of low dynamic range images (e.g., images that effectively capture image detail in bright areas, in dark areas, and the like) into a single HDR image.

Once an HDR image has been effectively captured, that HDR image can be displayed on a suitable display device, such as an LCD monitor or other suitable display device. However, oftentimes a display device can have a smaller contrast ratio than the dynamic range of the HDR image. As an illustration, a typical LCD monitor may have a contrast ratio of 1,000:1 while a typical HDR image can have a contrast ratio of 250,000:1. Accordingly, to display the high dynamic range image on the relatively low dynamic range display device, the dynamic range of the HDR image can be compressed to the available dynamic range of the display device in a technique referred to as "tone mapping."

Tone mapping can include, for example, "global tone mapping" and "local tone mapping." In global tone mapping, a particular mapping function can be evenly applied to all pixels of the HDR image. Global tone mapping may thus provide a way of compressing the luminance range of the HDR image in a manner that is computationally simple and easy to implement. However, since the same mapping function is applied evenly to all pixels, global tone mapping may result in a loss of contrast and detail to the HDR image.

Local tone mapping, on the other hand, can provide a mapping function that is adjusted based on the local detail of the HDR image. For example, a local tone mapping technique may apply a spatially-varying mapping function on each pixel of the HDR image, where the spatially-varying mapping function can be determined and adjusted based on the pixels surrounding the current pixel of interest (e.g., the pixel that is currently being processed by the local tone mapping). In this manner, a local tone mapping method can preserve the local contrast features of the image (e.g., lines, borders, areas of high contrast, and the like) and can increase the visibility and clearness of the details of the HDR image. In fact, local tone mapping techniques often result in compressed HDR images that are more pleasing to the human eye, due to the fact that human vision is more sensitive to areas of local contrast than to areas of global contrast. Accordingly, in some embodiments, local tone mapping can be performed in conjunction with global tone mapping to compress HDR images into visually appealing images in which the preservation of details and contrast has been increased.

However, although local tone mapping can help create luminance-compressed HDR images with good visual quality, local tone mapping can sometimes have undesirable effects. For example, current local tone mapping techniques often result in halo artifacts appearing around bright areas in the image. These halo artifacts can unnaturally darken portions of the bright region of the image and thus significantly degrade image quality. As another example, many local tone mapping techniques require a large window size on which to perform the local processing (e.g., a large number of surrounding pixels must be processed to perform the local tone mapping on a particular pixel of interest). Processing this large window size can require large amounts of computational power, large amounts of memory resources, and a significant amount of processing time. This, in turn, can make such local tone mapping techniques unsuitable for use in real-time or near real-time implementations.

FIG. 1 shows a block diagram of illustrative system 100 for implementing a local tone mapping algorithm. As will be described in greater detail below, system 100 can provide for a local tone mapping algorithm that, for example, operates with a small window size for the local spatial processing and that does not produce halo artifacts. For example, system 100 can provide for a local tone mapping algorithm that operates on a window size of 5×5 pixels. As another example, system 100 can provide for a local tone mapping algorithm that operates on a window size of 4×4 pixels, 6×6 pixels, or on any other suitable, small window size. In this manner, a system such as system 100 can allow for a system that not only compresses the luminance range of HDR images such that they can be clearly reproduced on a relatively low dynamic range display device without significant degradation of image quality, but system 100 can also provide for a local tone mapping technique that can, for example, be performed with relatively small computation power, with relatively small memory resources, and/or in a relatively small amount of processing time.

It should be understand that FIG. 1 is provided for the purpose of illustration and not for limitation, and that various modifications can be made to system 100 without departing from the present disclosure. For example, in some embodiments, the blocks of system 100 can include other blocks not combined or included in those shown in FIG. 1, or system 100 can include several instances of the blocks shown in FIG. 1. In some embodiments, one or more of the blocks can be omitted or moved. For the sake of simplicity, only one of each of the blocks is shown in FIG. 1.

System 100 can receive input 110 as an input signal and can provide output 120 as an output signal. For example, input 110 can include the red, green, and blue signals ("R/G/B") that can be generated by a pixel array of an HDR imaging device. Such an HDR imaging device could include, for example, a camera or other suitable imaging device with an array of light sensing elements (e.g., CCD-based light sensing elements, CMOS-based light sensing elements, and the like), where each light sensing element can be configured to sense one of red, green, or blue light and generate a red, green, or blue signal, respectively, based on the sensed light.

The dynamic range of the input signal, input 110, can be defined herein as [0, $M_{in}$] and include any suitable range of luminance. Similarly, the dynamic range of the output signal, output 120, can be defined herein as [0, $M_{out}$] and can include any suitable range of luminance. When the dynamic range of input 110 is greater than the dynamic range of output 120 (e.g., such as might occur when input 110 is generated from an HDR image and output 120 will be provided to a display device with a relatively low contrast ratio) then $M_{in} \geq M_{out}$. System 100 can generate output 120 from input 110 by mapping the dynamic range of input 110 into the dynamic range of output 120 (e.g., by mapping input 110 into the range of [0, $M_{out}$]). Moreover, as will be describe in greater detail below, system 100 can perform this function through a local tone mapping technique that can use a relatively small window size and that may not generate halo effects. In this manner, system 100 can compress input 110 into [0, $M_{out}$] while suitably preserving image detail and clarity, even in substantially dark and bright areas of the input image. Furthermore, as system 100 can operate with a relatively small window size and can also be implemented with relatively simple hardware, output 120 can be generated without utilizing substantial amounts of processing power, time, and or circuitry.

As shown in FIG. 1, input 110 can be provided to RGB to Y Converter 130. Converter 130 can use any suitable transform to break down the R/G/B signal of input 110 into its luminance component. The luminance component of input 110 is illustrated in FIG. 1 as the signal, "Y." For example, in some embodiments to determine the luminance component, Converter 130 can use a color transform to transform the R/G/B signal into the YCbCr color space, where Y is the luminance component of the input signal, Cb is the blue chroma component of the input signal, and Cr is the red chroma component of the input signal. In this case, the luminance, Y, of the input signal can be determined by the equation:

$$Y(x,y) = 0.299 * R(x,y) + 0.587 * G(x,y) + 0.114 * B(x,y) \qquad (1)$$

where Y(x,y) is the luminance of the pixel located at (x,y) in the HDR image (e.g., the current pixel of interest), R(x,y) is the red signal of the pixel located at (x,y), G(x,y) is the green signal of the pixel located at (x,y), and B(x,y) is the blue signal of the pixel located at (x,y).

In some embodiments, however, in addition to or instead of determining the luminance through the YCbCr color space, Converter 130 can determine the luminance of input 110 by transforming the R/G/B signal into the YCgCo color space. In this case, Y is the luminance component of the input signal, Cg is the green chroma component of the input signal, and Co is the orange chroma component of the input signal. When transforming the R/G/B signal to the YCgCo color space, the following forward color space transform can be used:

$$\begin{bmatrix} y \\ Co \\ Cg \end{bmatrix} = \begin{bmatrix} \frac{1}{4} & \frac{1}{2} & \frac{1}{4} \\ \frac{1}{2} & 0 & -\frac{1}{2} \\ -\frac{1}{4} & \frac{1}{2} & -\frac{1}{4} \end{bmatrix} \begin{bmatrix} R \\ G \\ B \end{bmatrix} \qquad (2)$$

Accordingly, when transforming the R/G/B signal into the YCgCo color space, the luminance of input 110 can be determined by the equation:

$$Y(x, y) = \frac{1}{2}\left[G(x, y) + \frac{R(x, y) + B(x, y)}{2}\right] \qquad (3)$$

In this manner, using the YCgCo color space instead of the YCbCr color space (e.g., and thus using equation (3) instead of equation (1)) to calculate the luminance of input 110 can provide significant complexity and hardware saving for system 100. For example, equation (3) can be implemented in hardware by using two shift components and two additions components for integer numbers. Equation (1), on the other hand, can require three multiplication components and two addition components for floating numbers, which would require a substantially greater number of transistors to implement. In this manner, using the YCgCo color space to calculate the luminance of input 110 can provide for a much cheaper implementation of system 100 that can provide savings in both hardware complexity and space. Another benefit of using the YCgCo color space is that this color space is exactly reversible from RGB color space.

The luminance signal, Y, may then be provided to Shape Adaptive Filter 140 which can decompose the luminance signal, Y, into its illumination component, L, and into it's reflectance component, F. For example, Shape Adaptive Filter 140 can decompose Y by using the filter $H_\sigma$, that can estimate the illumination component through:

$$H_\sigma(Y(x, y)) = \frac{\sum_{x_i, y_i \in W} \omega(x_i, y_i) \cdot Y(x_i, y_i)}{\sum_{x_i, y_i \in W} \omega(x_i, y_i)} \approx L(x, y) \quad (4)$$

where (x,y) is the coordinates of the current pixel of interest (e.g., the pixel currently undergoing processing by system 100), W is a window centered at pixel (x, y), and $\omega(x_i, y_i)$ are the filter weights defined by:

$$\omega(x_i, y_i) = \begin{cases} 3, & \text{if } |Y(x_i, y_i) - Y(x, y)| < c_1\sigma \\ 2, & \text{if } c_1\sigma \leq |Y(x_i, y_i) - Y(x, y)| < c_2\sigma \\ 1, & \text{if } c_2\sigma \leq |Y(x_i, y_i) - Y(x, y)| < c_3\sigma \\ 0, & \text{otherwise} \end{cases} \quad (5)$$

where $\sigma$ is the filter strength, and $c_1$, $c_2$, and $c_3$ are filter parameters. $c_1$, $c_2$, and $c_3$ can include any suitable parameters. For example, in some embodiments, $c_1=1$, $c_2=2$, and $c_3=3$. In this manner, by weighting pixels more heavily that are "similar" to the center pixel of interest, the shape adaptive filter of equation (4) can vicariously adapt its shape to the image within the window, W. For example, equation (4) can adjust its weighting based on edges, lines, and other suitable features within the window. The requisite similarity between the pixel of interest and its neighboring pixels (e.g., within window, W) can be controlled by the filter strength, $\sigma$. For example, in some embodiments, a filter strength of:

$$\sigma = \frac{M_{in} + 1}{8} \quad (6)$$

can be used to estimate the illumination component, L, through equation (4). The filter strength of equation (6) may, for example, provide for a shape adaptive filter that is able to remove small image structures while retaining high-contrast edges. Alternatively, any other suitable value of $\sigma$ can be used.

Moreover, Shape Adaptive Filter 140 can operate using a relatively small window size, W. For example, in some embodiments, W can include a 5×5 window size. As another example, in some embodiments, W can include a 4×4 window size, a 6×6 window size, or any other suitably small window size. In this manner, by using a shape adaptive filter (e.g. that utilizes equations such as equation (4)), the luminance signal can be decomposed using a window size that can be significantly smaller than other decomposition techniques. As a result, system 100 can operate to compress input 110 in way that significantly reduces processing time and complexity for the system. Moreover, using Shape Adaptive Filter 140 can also aid in preventing the erroneous creation of halo effects through the local tone mapping process.

As mentioned above, system 100 can map the high dynamic range, [0, $M_{in}$] of an HDR image into the lower, dynamic range of a display device, [0, $M_{out}$]. However, before this mapping is completed, in some embodiments the contrast of the input image (e.g., input 110) can be compressed. In order to compress the contrast of the input image, the illumination component, L, of the input signal can be suitably processed. For example, FIG. 1 shows that the illumination component, L, can be input to Power Function 150 and then Scaling Block 152 to perform the contrast compression.

Power Function 150 can apply any suitable power function to L to perform the contrast compression process. For example, in some embodiments, Power Function 150 can apply the following power function equation to the illumination component:

$$P(L(x, y)) = M_{in} \cdot \left(\frac{L(x, y)}{M_{in}}\right)^{\left[\left(1 - \frac{L(x,y)}{M_{in}}\right)\gamma_{Low} + \left(\frac{L(x,y)}{M_{in}}\right)\gamma_{High}\right]} \quad (7)$$

where $\gamma_{Low}$ and $\gamma_{High}$ are the contrast control parameters for the image dark regions and the image bright regions, respectively. $\gamma_{Low}$ and $\gamma_{High}$ can include any suitable range of values. For example, in some embodiments, $0 < \gamma_{Low} \leq 1$, and $0 < \gamma_{High} < 1.5$. Choosing a value for $\gamma_{Low}$ that is closer to 0 can make dark regions of the image become brighter in appearance. Similarly, choosing a value of $\gamma_{High}$ that is closer to or greater than 1 can make bright regions of the image appear darker in appearance. In this manner, by choosing suitable values for $\gamma_{Low}$ and $\gamma_{High}$, bright regions of the image can be made darker, and dark regions of the image can be made brighter, thus suitably compressing the contrast of the input image.

As illustrated in FIG. 1, the signal output from Power Function 150 is referred to herein as "$L_p$." In other words:

$$L_p(x,y) = P(L(x,y)) \quad (8)$$

In some embodiments, the contrast compression can result in reducing the range of the $L_p$ signal. Accordingly, the $L_p$ signal can be provided to Scaling Block 152 to scale its range back into the original, [0, $M_{in}$] range. As an example, Scaling Block 152 can apply the following function to $L_p$:

$$\tilde{L}(x, y) = \frac{M_{in} \cdot (L_p(x, y) - L_{pmin})}{L_{pmax} - L_{pmin}} \quad (9)$$

where $\tilde{L}$ is the processed illumination component of input 110 at the pixel coordinates (x, y), $L_{pmin} = P(Y_{min})$ and $L_{pmax} = P(Y_{max})$ where P(x) is the power function applied by Power Function 150 (e.g., equation (7), and $Y_{min}$ and $Y_{max}$ are the minimum and maximum values of the luminance signal, Y, respectively.

In some embodiments, the input image can additionally or alternatively have its image be sharpened. For example, in some embodiments, to sharpen the input image, the appropriate processing can be performed on the reflectance component, F, of input 110. The reflectance component, F, can contain information related to the details of the image and can be calculated from the illumination component, L. For example, in some embodiments, the Retinex theory can be used to estimate the reflectance of the luminance signal through:

$$Y(x,y) = L(x,y) \cdot F(x,y) \quad (10)$$

where equation (10) can be manipulated to define the reflectance component, F, at pixel (x,y) as:

$$F(x, y) = \frac{Y(x, y)}{L(x, y)} \quad (11)$$

For example, as shown in FIG. 1, divider 160 can divide the luminance signal, Y (e.g., generated by Converter 130) by the illumination component, L (e.g., generated by Shape Adaptive Filter 140) to calculate the reflectance component, F. To sharpen the input image, the reflectance component, F, can be provided to Log Function 162 and then Noise Coring Block 164 to generate a sharpening signal, $F_s$. $F_s$ and F may then both be provided to Sharpening Block 166 to generate a processed reflectance signal, $\tilde{F}$, in which the image details of input 110 have been sharpened.

Figure 2:
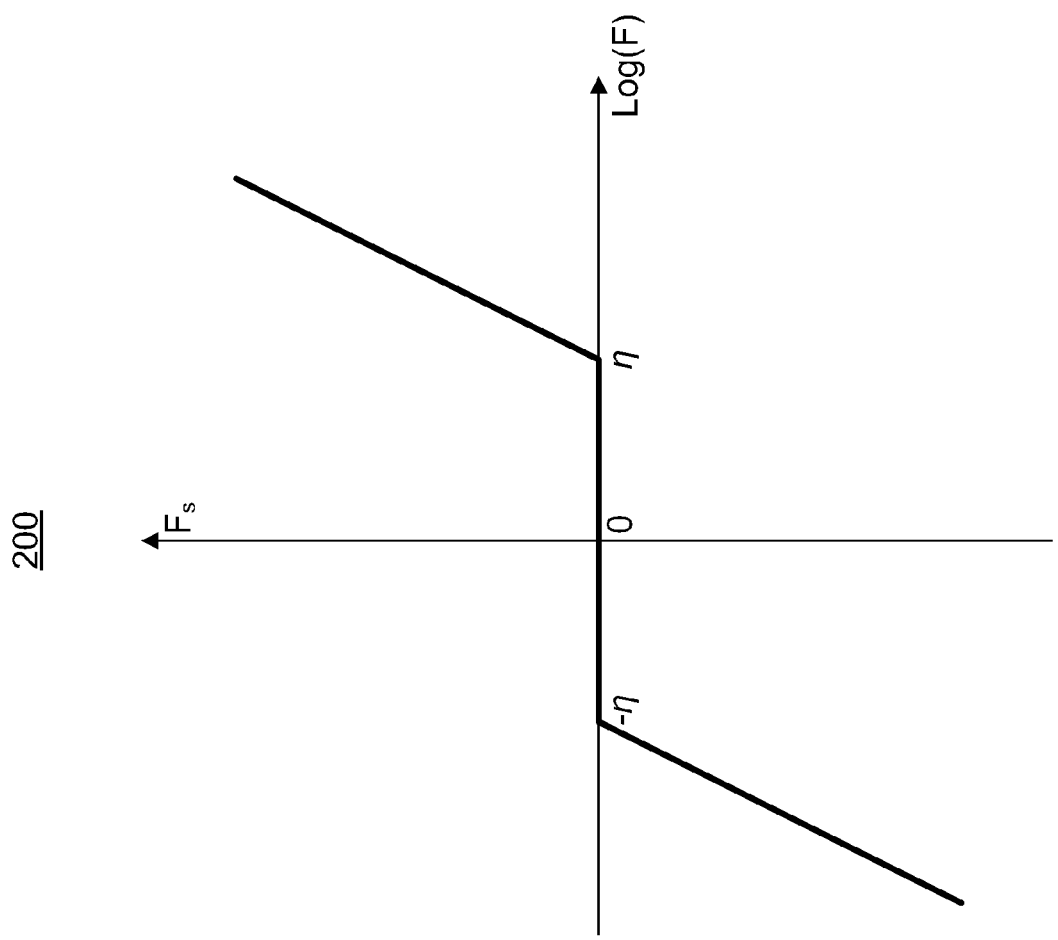
FIG. 2 shows an illustrative graph of a coring function that can be used in a local tone mapping algorithm in accordance with some embodiments of the invention.

As mentioned above, to calculate the sharpening function, $F_s$, the reflectance component can first be processed by Log Function 162 to generate Log(F). In some embodiments, to avoid inadvertently boosting any noise in the image signal, a coring function can then be applied to Log(F) prior to the image sharpening. For example, Log(F) can be input into Noise Coring Block 164 which can apply any suitable coring function to Log(F). As an example, Noise Coring Block 164 can apply the coring function:

$$F_s(x, y) = \begin{cases} 0, & \text{if } |\log F(x, y)| \leq \eta \\ \log F(x, y) - \eta, & \text{if } \log F(x, y) > \eta \\ \log F(x, y) + \eta, & \text{if } \log F(x, y) < -\eta \end{cases} \quad (12)$$

where F(x, y) is the reflectance component at the pixel coordinates (x, y), $F_s(x, y)$ is the generated sharpening signal, and $\eta$ is a suitably small value to control the noise. For example, in some embodiments $0 < \eta < 0.5$. Alternatively, $\eta$ can include any other suitable range of values. FIG. 2 shows illustrative graph 200 of a coring function that can be used by Noise Coring Block 164. For example, graph 200 can correspond to equation (12).

Figure 3:
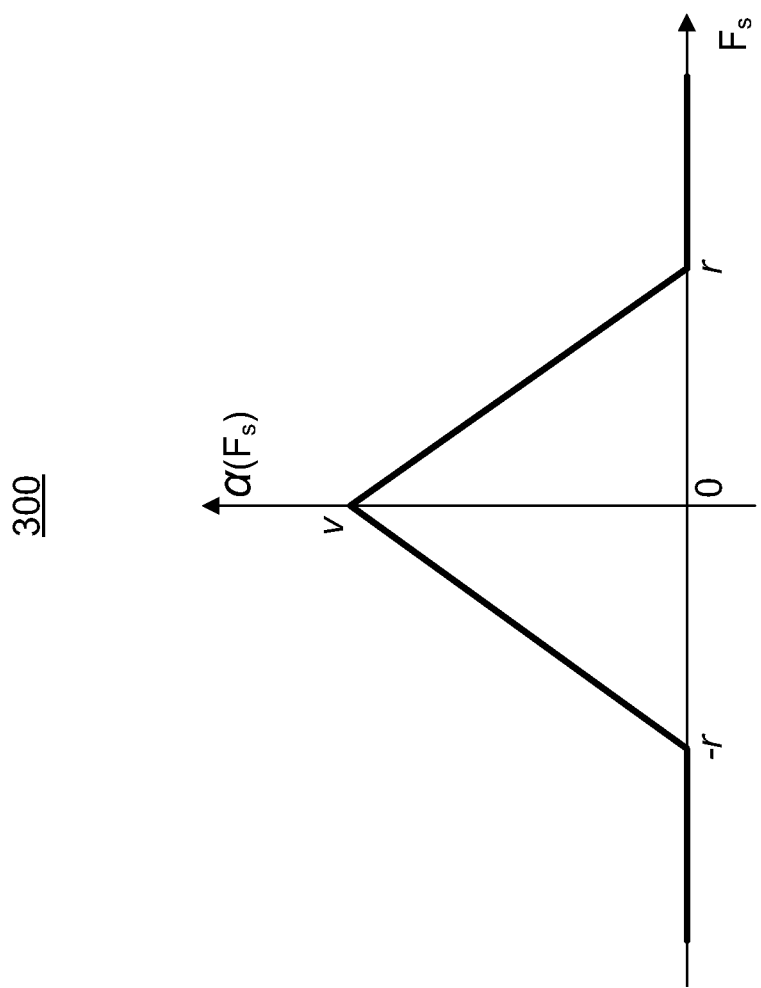
FIG. 3 shows an illustrative graph of a sharpening strength function that can be used in a image sharpening process of a local tone mapping algorithm in accordance with some embodiments of the invention.

Image sharpening may then be performed on the image signal by processing the reflectance component, F, and sharpening signal $F_s$. For example, as illustrated in FIG. 1, Sharpening Block 166 can receive F and $F_s$ and may then perform any suitable sharpening processes on these received signals. As an example, Sharpening Block 166 can execute the equation:

$$\tilde{F}(x,y) = F(x,y) + \alpha(F_S) \cdot F_S \quad (13)$$

where $\tilde{F}(x, y)$ is the processed, sharpened reflectance component at the pixel coordinates (x, y), and $\alpha(F_s)$ is the sharpening strength function, that can be defined by:

$$\alpha(F_S(x, y)) = \begin{cases} v \cdot \dfrac{r - |F_S(x, y)|}{r}, & \text{if } |F_S(x, y)| \leq r \\ 0, & \text{otherwise} \end{cases} \quad (14)$$

where v can control the magnitude of the sharpening and r can control the range of the sharpening. For example, in some embodiment v can be any suitable positive value, such as a value from 0 to 4. In some embodiments, v can have a default value of v=1, v=2, or any other suitable default value. Similarly, r can include any suitable value, such as a value of 0<r<1. In some embodiments, r can have a default value of r=0.5, or any other suitable default value. FIG. 3 shows illustrative graph 300 of a sharpening strength function that can be used by Sharpening Block 166. For example, graph 300 can correspond to equation (14).

After image sharpening and contrast compression, the processed illumination component, $\tilde{L}$, and the processed reflectance component, $\tilde{F}$, can be recomposed to generate the processed luminance signal, $\tilde{Y}$. For example, similar to equation (10), the Retinex Theory can be used to define:

$$\tilde{Y}(x,y) = \tilde{L}(x,y) \cdot \tilde{F}(x,y) \quad (15)$$

For example, the processed illumination component and the processed reflectance component can be multiplied together through Multiplier 170 to generate the processed luminance signal, $\tilde{Y}$. The processed luminance signal can then be provided to RGB Processing Block 180, that can transform $\tilde{Y}$ into its counterpart, processed R, G, and B signals, $\tilde{R}/\tilde{G}/\tilde{B}$. As an example, RGB Processing Block 180 can receive the R/G/B signal (e.g., from input 110), the Y signal (e.g., from Converter 130), and the $\tilde{Y}$ signal. The processed R, G, and B signals can be calculated by RGB Processing Block 180 through:

$$\tilde{R}(x,y) = [R(x,y)/Y(x,y)] \cdot \tilde{Y}(x,y) \quad (16)$$

$$\tilde{G}(x,y) = [G(x,y)/Y(x,y)] \cdot \tilde{Y}(x,y) \quad (17)$$

$$\tilde{B}(x,y) = [B(x,y)/Y(x,y)] \cdot \tilde{Y}(x,y) \quad (18)$$

To form the output signal, output 120, the $\tilde{R}/\tilde{G}/\tilde{B}$ signal can be provided to Range Mapping 190 to scale down the processed RGB signal to the dynamic range of the display device. Any suitable process can be used for scaling down the dynamic range of the $\tilde{R}/\tilde{G}/\tilde{B}$ signal such as, for example:

$$R_{out}(x,y) = M_{out} \cdot \text{Gamma}(\tilde{R}(x,y)/M_{in}) \quad (19)$$

$$G_{out}(x,y) = M_{out} \cdot \text{Gamma}(\tilde{G}(x,y)/M_{in}) \quad (20)$$

$$B_{out}(x,y) = M_{out} \cdot \text{Gamma}(\tilde{B}(x,y)/M_{in}) \quad (21)$$

where Gamma(x) is the standard gamma correction function for the display device (e.g., the display device including a contrast ratio of [0, $M_{out}$]) and where $R_{out}(x,y)$, $G_{out}(x,y)$, and $B_{out}(x,y)$ are the output red, green, and blue signals, respectively of output 120 at the pixel coordinates (x,y).

In this manner, a system such as system 100 of FIG. 1, can provide for local tone mapping of an input image. This local tone mapping can be utilized in addition to or instead of a global tone mapping algorithm to compress the high dynamic range of the input image into the dynamic range of a display device. The local tone mapping method of system 100 can provide many benefits to the output image. For example, system 100 can spatially vary the mapping function based on the neighboring pixels, which can allow for an increase in the image's local contrast as well as an increase in the visibility of details and fine features of the image. As another example, Shape Adaptive Filter 140 of system 100 that can reduce errors, such as halo artifacts, and can also reduce the need for a large window size. The halo errors may additionally be reduced by the small kernel size of the contrast compression components of system 100. Moreover, the small window size can allow system 100 to perform the requisite calculations in a significantly reduced processing time and can also reduce the overall complexity of the local tone mapping system. As yet another example, system 100 can calculate the luminance signal, Y, from the YCgCo color space. Using the YCgCo color space can provide significant savings in hardware complexity and space than if, for example, the YCbCr color space had been used to calculate the luminance signal.

Figure 4:
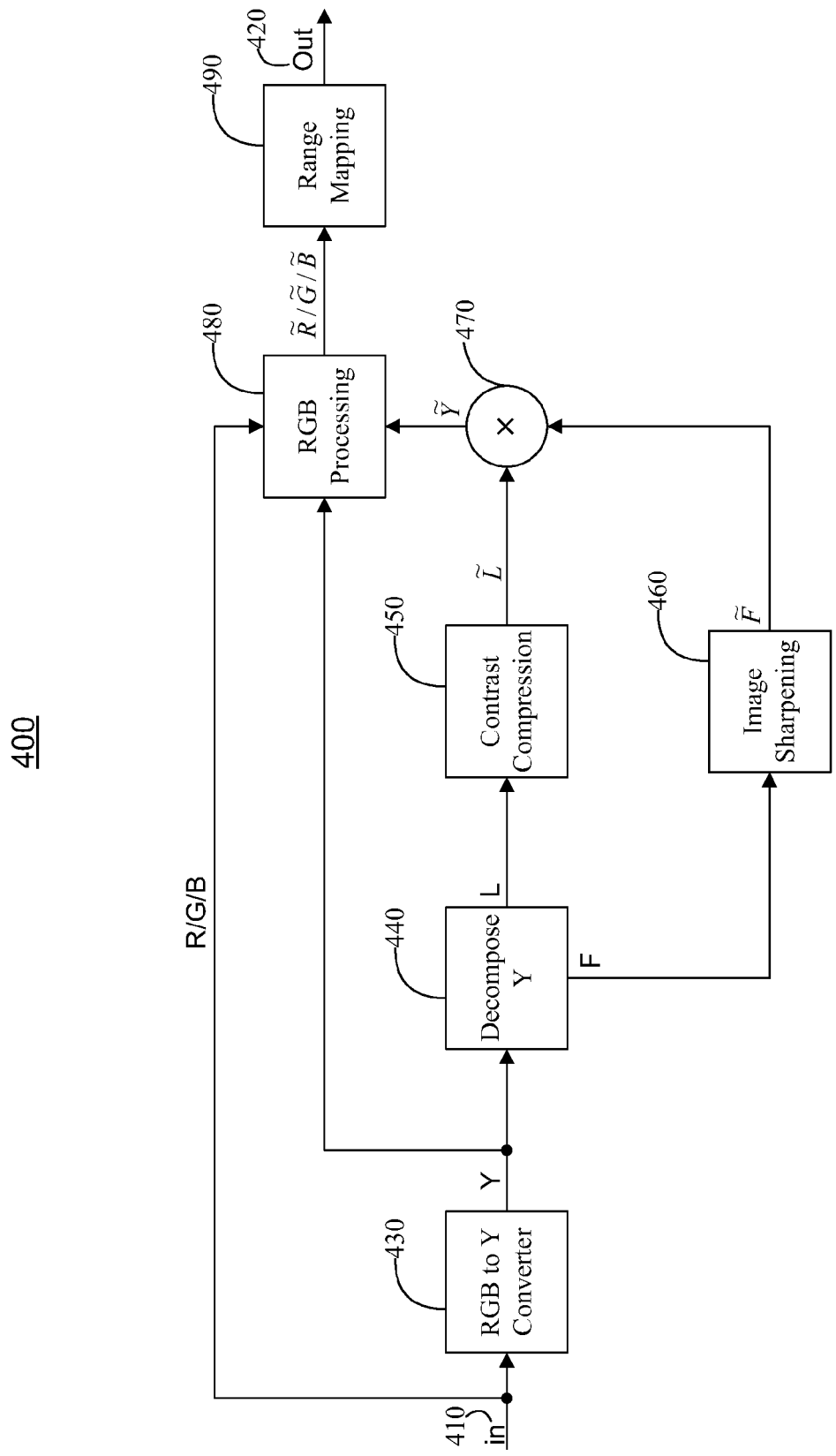
FIG. 4 shows a block diagram of an illustrative generalized system for implementing a local tone mapping algorithm in accordance with some embodiments of the invention.

However, although specific components and examples are provided in FIG. 1, one skilled in the art could appreciate that this is for the purpose of illustration and not for limitation. Rather, it should be understand that any other suitable components could be used. For example, rather than Power Function 150 and Scaling Block 152, in some embodiments any other suitable contrast compression components could be used. As an illustration, FIG. 4 shows generalized system 400 for performing a local tone mapping function. For example, system 400 could be a generalized block diagram of system 100.

System 400 can receive input 410 and generate output 420 that can correspond to input 110 and output 120 of FIG. 1, respectively. Input 410 can be provided to RGB to Y Converter 420 that can calculate the luminance signal of input 410 through any suitable method. For example, Converter 420 can utilize a YCbCr color transform, a YCgCo color transform, any other suitable transform, or any other suitable technique calculate the luminance signal, Y. The luminance signal, Y, can then be provided to Decomposing Y Block 440 that can decompose the luminance signal into its illumination and reflectance components through any suitable technique. For example, in some embodiments, a shape adaptive filter can be used to estimate the illumination component, L, of the luminance signal. The reflectance component, F, can then be calculated by dividing the luminance signal by the illumination component.

Contrast Compression Block 450 may compress the contrast of the input image (e.g., input 440) through any suitable manner to produce the processed illumination component signal, $\tilde{L}$. For example, as shown in FIG. 4, Contrast Compression Block 450 can receive and process the illumination component, L, of the input image to perform the compression. As an illustration, in some embodiments, Contrast Compression Block 450 can execute a power function on L to reduce the contrast of the signal. Alternatively, any other technique for suitably darkening bright regions of the image and/or brightening dark regions of the image can be used. In some embodiments, the range of L can be mapped into the dynamic range of input 440 (e.g., $[0, M_{in}]$) by Contrast Compression Block 450.

Image Sharpening Block 460 can sharpen the input image through any suitable manner to generate the processed reflectance component, $\tilde{F}$. For example, in some embodiments Image Sharpening Block can receive and perform any suitable image sharpening processes on the reflectance component, F. As an example, an appropriate log function can be applied to F. Alternatively, any other suitable algorithm for sharpening and clarifying the image details (e.g., image lines, fine features, and the like) of the input image can be applied. In some embodiments, Image Sharpening Block 460 can apply noise coring to the reflectance component to reduce the possibility of inadvertently magnifying noise within the image through the image sharpening.

System 400 can calculate the processed luminance signal, $\tilde{Y}$. $\tilde{Y}$ can correspond to a processed version of the luminance signal of input 410, in which any suitable contrast compression, image sharpening, or other suitable algorithms have been applied to the input signal. For example, as show in FIG. 4, $\tilde{Y}$ can be generated by multiplying $\tilde{F}$ by $\tilde{L}$ through Multiplier 470. RGB Processing 480 may then convert $\tilde{Y}$ to an RGB signal through any suitable process. For example, a reverse YCgCo color space transform, a reverse YCbCr transform, equations such as equations (16), (17), and (18), or any other suitable technique can be used to generate the processed RGB signal, $\tilde{R}/\tilde{G}/\tilde{B}$. The $\tilde{R}/\tilde{G}/\tilde{B}$ signal can correspond to a processed version of input 410, in which any suitable contrast compression, image sharpening, or other suitable algorithms have been applied to input 410. Range Mapping 490 may then map the $\tilde{R}/\tilde{G}/\tilde{B}$ signal into the dynamic range of the appropriate display device, (e.g., $[0, M_{out}]$) to generate the output signal, output 420.

Figure 5:
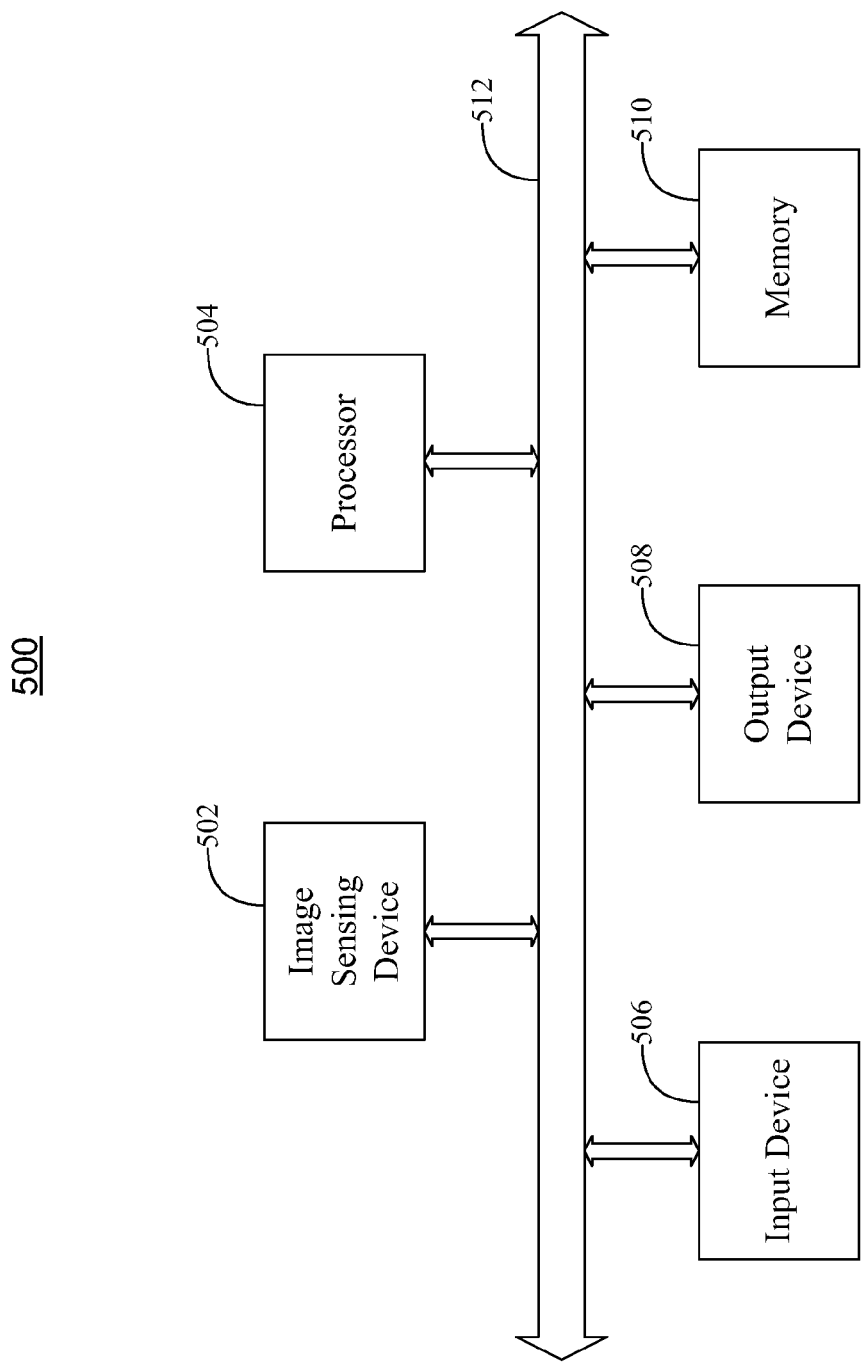
FIG. 5 shows an schematic view of an illustrative image processing system for performing local tone mapping in accordance with some embodiments of the invention.

FIG. 5 shows illustrative image processing system 500 for performing local tone mapping of an HDR image. Image processing system 500 can include any suitable system or device for performing the local tone mapping process. For example, image processing system 500 could include a computer system (e.g., a desktop computer, a laptop computer, and the like), an imaging device (e.g., a camera, scanner, or other device for capturing an image), a display device (e.g., a monitor), a cellular telephone, a portable data assistant ("PDA"), a portable gaming device, or any other suitable system that could execute a local tone mapping algorithm, such as an algorithm corresponding to system 100 or system 400.

System 500 can include image sensing device 502, processor 504, input device 506, output device 508, memory 510, and bus 512. In some embodiments, one or more of the components of system 500 can be combined or omitted or can be external to the system. For example, in some embodiments, image sensing device 502 can be external to system 500, and the image signal generated by image sensing device 502 can be transmitted as an input to system 500 (e.g., and received by I/O circuitry 506). In some embodiments, system 500 can include other components not combined or included in those shown in FIG. 5 (e.g., motion detection components or a power supply), or several instances of the components shown in FIG. 5. For the sake of simplicity, only one of each of the components is shown in FIG. 5.

Image sensing device 502 could include any suitable circuitry for sensing an image and generating an HDR image signal corresponding to the sensed image. For example, in some embodiments, image sensing device 502 could include an array of light sensing elements. The light sensing element could include, for example, a charge-coupled device ("CCD") or complimentary metal oxide semiconductor ("CMOS") based pixel. Each light sensing element can sense light at their respective pixel array location, and generate an image signal corresponding to that pixel location.

Processor 504 can include any circuitry operative to control the operations and performance of system 500. For example, processor 504 can be used to run operating system applications, firmware applications, or any other application. In some embodiments, processor 504 can drive a display (e.g., of output device 508) and process inputs received from a user interface (e.g., of input device 506) of system 500. In some embodiments, processor 504 can run algorithms for performing local tone mapping of an image signal (e.g., an image signal generated by image sensing device 502). For example, processor 504 can run an algorithm corresponding to system 100 or system 400.

Input device 506 can include any suitable input for receiving inputs from a user and/or component of system 500. For example, input device 506 can include one or more of a keyboard, mouse, microphone, touch screen, track ball, button, switches, accelerometer, shutter release button, a photodetector, or any other suitable input device. Input device 506 can also include any circuitry operative to convert (and encode/decode, if necessary) analog signals and other signals received by input device 506 into digital data, and vice-versa.

Output device 508 can include any suitable device for displaying or outputting information. For example, output device 508 can display an HDR image (e.g., defined by input 110 or input 410) whose dynamic range has been compressed into the dynamic range of the output device. Alternatively or additionally, output device 508 can display or output any suitable information and could include one or more of a monitor, speakers, headsets, projector, or any other suitable output device.

Memory 510 can include, for example, one or more storage mediums including a hard-drive, solid state drive, flash memory, ROM, cache memory, RAM, or any other suitable type of storage component, or any combination thereof. In some embodiments, memory 510 can be a removable storage medium, such as removable flash memory. Memory 510 can store any suitable data such as, for example, digital images created by an image sensing device 502.

In some embodiments, system 500 can include bus 512 operative to provide a data transfer path for transferring data to, from, or between image sensing device 502, processor 504, input device 506, output device 508, memory 510, and any other component included in system 500.

It will be apparent to those of ordinary skill in the art that methods or algorithms involved in the invention may be embodied in a computer program product that includes a machine readable and/or usable medium. For example, such a computer usable medium may consist of a read only memory device, such as a CD ROM disk or conventional ROM device, or a random access memory, such as a hard drive device or a computer diskette, or flash memory device having a computer readable program code stored thereon.

The above described embodiments of the invention are presented for purposes of illustration and not of limitation.

What is claimed is:

1. A method comprising:
calculating an illumination component of an image input signal of high dynamic range by processing the input signal with a shape adaptive filter;
processing the calculated illumination component to generate a processed illumination component in which a contrast of the input signal has been compressed;
processing the calculated illumination component to generate a processed reflectance component in which at least one feature of the input signal has been sharpened;
generating a processed input signal from the processed illumination component and the processed reflectance component, wherein the processed input signal comprises a contrast-compressed and image-sharpened version of the input signal; and
mapping the processed input signal into a dynamic range of a display device,
wherein calculating the illumination component further comprises:
calculating the input signal's associated luminance signal by transforming a RGB input signal into a YCgCo color space; and
processing the luminance signal with the shape adaptive filter to calculate the illumination component,
and wherein the shape adaptive filter calculates the illumination component through the equation:

$$L(x, y) = \frac{\sum_{x_i, y_i \in W} \omega(x_i, y_i) \cdot Y(x_i, y_i)}{\sum_{x_i, y_i \in W} \omega(x_i, y_i)}.$$

where (x,y) are the co-ordinates of a current pixel being processed, $\omega(x_i, y_i)$ are filter weights of the shape adaptive filter, Y is a luminance signal, and W is a window of pixels centered at pixel (x,y).

2. The method of claim 1, wherein $\omega$ comprises one or more filter weights of the shape adaptive filter defined by:

$$\omega(x_i, y_i) = \begin{cases} 3, & \text{if } |Y(x_i, y_i) - Y(x, y)| < c_1\sigma \\ 2, & \text{if } c_1\sigma \le |Y(x_i, y_i) - Y(x, y)| < c_2\sigma \\ 1, & \text{if } c_2\sigma \le |Y(x_i, y_i) - Y(x, y)| < c_3\sigma \\ 0, & \text{otherwise} \end{cases}$$

where $\sigma$ is a filter strength, and c1, c2 and c3 are filter parameters, of the shape adaptive filter.

3. The method of claim 2, wherein c1=1, c2=2, c3=3, and wherein $\sigma$ comprises a filter strength of the shape adaptive filter defined by:

$$\sigma = \frac{M_{in} + 1}{8},$$

where $M_{in}$ is the dynamic range of the input signal.

4. The method of claim 1, wherein generating the processed input signal comprises:
multiplying the processed illumination component by the processed reflectance component to generate a processed luminance signal; and
transforming the processed luminance signal into a processed red, green, blue signal, wherein the processed red, green, blue signal comprises the processed input signal.

5. A system comprising:
a decomposer operable to receive a high dynamic range ("HDR") image signal and decompose the image signal into at least an illumination component and a reflectance component;
a contrast compressor operable to receive the illumination component and compress the contrast of the image signal by processing the illumination component;
an image sharpener operable to receive the reflectance component and sharpen an image of the image signal by processing the reflectance component;
a multiplier operable to multiply the processed illumination component by the processed reflectance component to calculate a processed luminance signal;
a RGB processor operable to transform the processed luminance signal into its associated red, green, and blue signals; and
a range mapper operable to map a dynamic range of the associated red, green, and blue signals into a dynamic range of a display device,
wherein the decomposer:
calculates the illumination component through the equation:

$$L(x, y) = \frac{\sum_{x_i, y_i \in W} \omega(x_i, y_i) \cdot Y(x_i, y_i)}{\sum_{x_i, y_i \in W} \omega(x_i, y_i)},$$

where (x,y) are the co-ordinates of a current pixel being processed, $\omega(x_i, y_i)$ are filter weights of the shape adaptive filter, Y is a luminance signal, and W is a window of pixels centered at pixel (x,y),
calculates the input signal's associated luminance signal by transforming a RGB input signal into a YCgCo color space; and
processes the luminance signal to calculate the illumination component.

6. The system of claim 5, wherein the decomposer comprises a shape adaptive filter.

7. The system of claim 5, further comprising:
a RGB to Y converter operable to:
transform the HDR image signal from its associated red, green, and blue signals into at least a luminance signal; and transmit the luminance signal to the decomposer for decomposing into the illumination component and the reflectance component.

8. The system of claim 7, wherein the decomposer is further operable to:
pass the luminance signal through a shape adaptive filter to calculate the luminance component; and
calculate the reflectance component by dividing the luminance signal by the illumination component.

9. The system of claim 5, wherein the display device comprises at least one of a computer monitor, a television, and a display of a laptop computer.

10. The system of claim 5, wherein the dynamic range of the display device is less than a dynamic range of the HDR image signal.

11. A system for performing local tone mapping of an input image, comprising:
a contrast compressor operable to receive and process an illumination component signal of the input image by:
executing a power function on the illumination component signal to generate an Lp signal; and
mapping a dynamic range of the Lp Signal into a dynamic range of the input image to generate a contrast-compressed signal;
an image sharpener operable to receive and process a reflectance component signal of the input image by:
executing a log function on the reflectance component signal to generate a Log(F) signal;
executing a noise coring function on the Log(F) signal to reduce magnification of noise, thereby generating a noise-cored signal; and
processing the received reflectance component signal and the noise-cored signal to generate a image-sharpened signal; and
a range mapper operable to:
generate a processed image signal from the contrast-compressed signal and the image-sharpened signal; and
map the dynamic range of the processed image signal into a dynamic range of a display device,
wherein the contrast compressor is further operable to:
execute a power function on the illumination component defined by:

$$P(L(x, y)) = M_{in} \cdot \left(\frac{L(x, y)}{M_{in}}\right)^{\left[\left(1-\frac{L(x,y)}{M_{in}}\right)\gamma_{Low} + \left(\frac{L(x,y)}{M_{in}}\right)\gamma_{High}\right]},$$

where L(x,y) is the illumination component at a pixel of interest in the input image, and $M_{in}$ is the dynamic range of the input image.

12. The system of claim 11, wherein the contrast control parameters of the power function comprise the ranges: $0<\gamma_{Low}\leq 1$ and $0<\gamma_{High}<1.5$.

13. The system of claim 11, wherein the image sharpener is further operable to:
execute a noise coring function defined by:

$$F_s(x, y) = \begin{cases} 0, & \text{if } |\log F(x, y)| \leq \eta \\ \log F(x, y) - \eta, & \text{if } \log F(x, y) > \eta \\ \log F(x, y) + \eta, & \text{if } \log F(x, y) < -\eta \end{cases}$$

where (x,y) is a pixel of interest, and q is a variable of the log function.

14. The system of claim 13, wherein the variable η of the log function comprise the range 0<η<0.5.

15. The system of claim 11, wherein the range mapper is further operable to:
execute a standard gamma correction function of the display device on the processed image signal to map the dynamic range of the processed image signal into the dynamic range of the display device.

16. The system of claim 11, wherein the input image comprises a high dynamic range image.

\* \* \* \* \*